July 7, 1931.  G. W. DAVEY ET AL  1,813,386
WATER GAS CARBURETOR
Filed Feb. 2, 1926   2 Sheets-Sheet 1

Frank H. Waite
George W. Davey
INVENTORS

BY
Charles A. Clark
ATTORNEY

July 7, 1931.                G. W. DAVEY ET AL                1,813,386
                              WATER GAS CARBURETOR
                              Filed Feb. 2, 1926                2 Sheets-Sheet 2

Frank H. Waite
George W. Davey
                INVENTORS
BY
Charles A. Clark
                ATTORNEY Patented July 7, 1931

1,813,386

UNITED STATES PATENT OFFICE

GEORGE W. DAVEY AND FRANK H. WAITE, OF LONG ISLAND CITY, NEW YORK

WATER GAS CARBURETOR

Application filed February 2, 1926. Serial No. 85,454.

Our invention relates to water gas carburetors and is more particularly concerned with means for increasing the efficiency and life of that part of a water gas set commonly known as the carburetor, although this means may be utilized and applied in principle, for other purposes.

One object of our invention is to provide means for preheating and drying low pressure steam and utilizing the same in conjunction with preheated gas oil and preventing the checkerbrick of the carburetor from absorbing oil and carbon.

Another object of our invention is to preheat air, circulatable within and throughout a portion of the lining of the carburetor, cooling the lining while simultaneously transmitting the heat taken away by the circulating air.

A still further object of our invention is to provide means for intermittently circulating two separate circulations of air and steam throughout the walls or linings of the carburetor and injecting the same preheated and dried into the apparatus where it is utilized.

We accomplish these results by the means hereinafter described and illustrated in the accompanying drawings, wherein like numerals refer to similar parts throughout the several views, and in which:—

Figure 1:
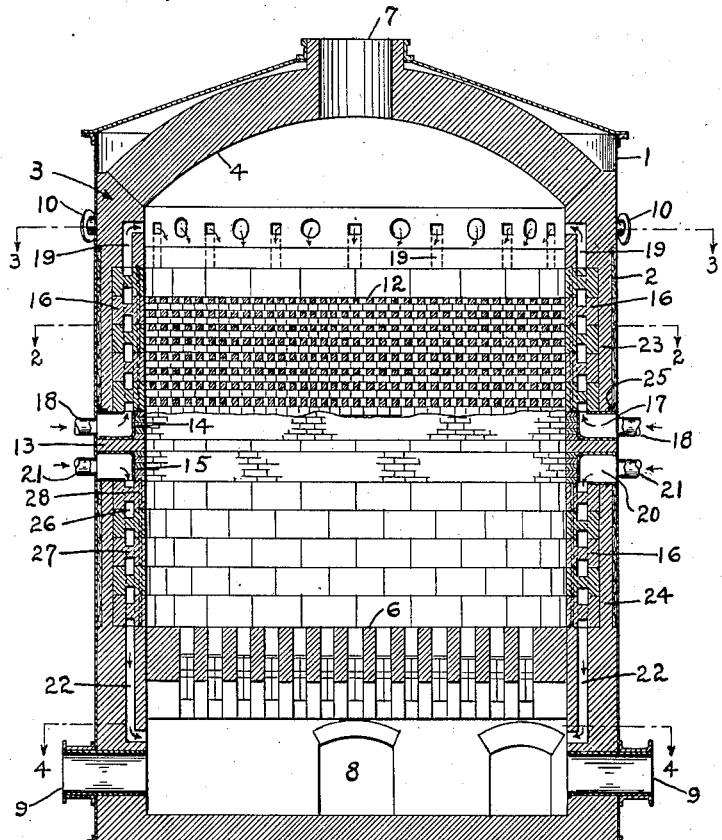
Figure 1 is a vertical section of a water gas carburetor.
Figure 2:
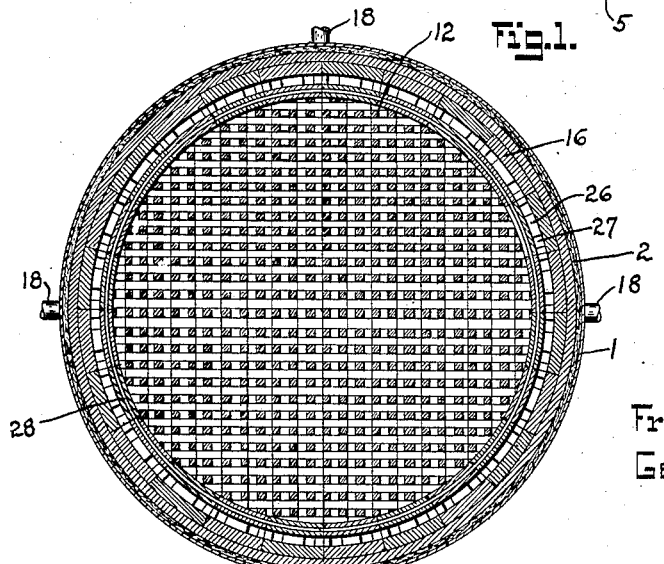
Figure 2 is a cross section taken on lines 2—2 of Figure 1.
Figure 3:
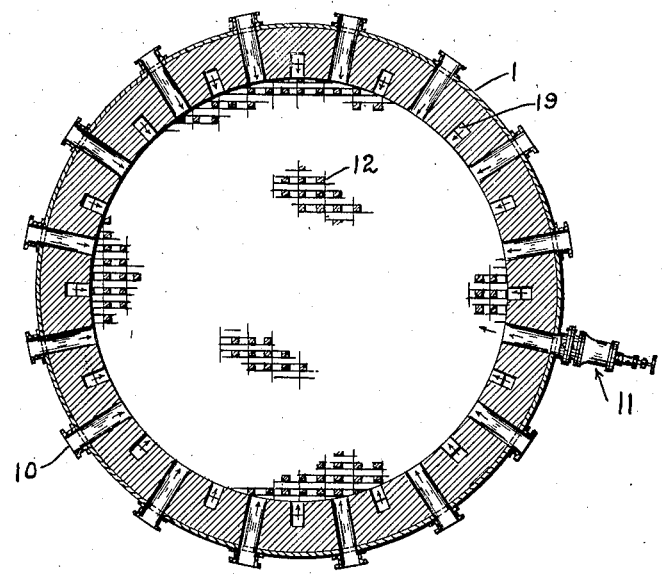
Figure 3 is a cross section taken on lines 3—3 of Figure 1.
Figure 4:
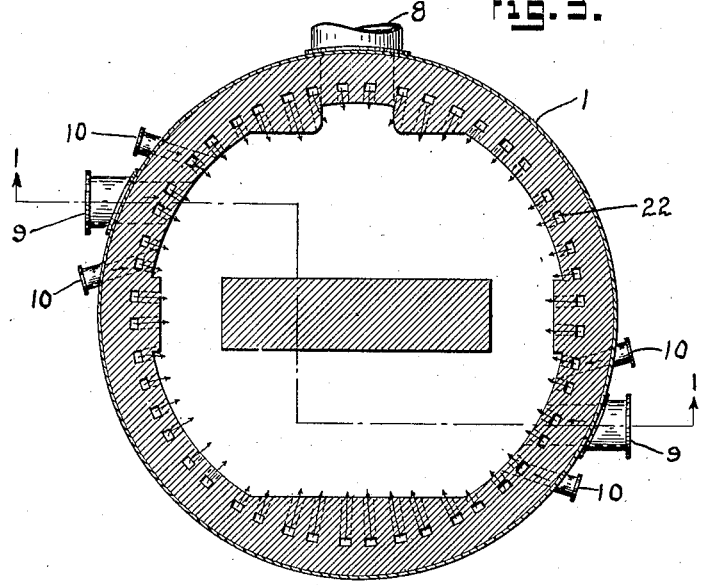
Figure 4 is a cross section taken on lines 4—4 of Figure 1.

It is well known to all familiar with the art that water gas, as it comes from the generator does not contain the desired calorific and illuminating values required for illumination. Therefore, it is conducted into the carburetor, which is lined with fire brick and filled with checkerwork.

These checker brick have been preheated and are continually reheated to about 1350 to 1400 degrees Fahrenheit at regular intervals by burning the blast gases from the water gas generator during the air blast periods.

Then the air blast gases from the generator are turned off, and a spray of preheated gas oil, which is a distillation product of petroleum, is injected through the top of the carburetor, so that the spray of oil will impinge upon the hot brickwork. The oil is injected during the time that hot water gas is passing through the carburetor from the water gas generator.

The oil is thus volatilized or gasified. The resulting oil gas and water gas is then conducted to the superheater where the various gases formed are fixed.

The fire brick have much to do with the yields and the smooth operation of a water gas carburetor.

The carburetor checker brick must be refractory, the better to withstand the heat for considerable periods of time without fusion; they must withstand the frequent fluctuations of temperature without deterioration; and they must not absorb the oil or carbon deposit, but must quickly vaporize it.

It is self evident that when superheated dry steam is injected into the top together with the preheated gas oil, the tendency will be to prevent the checkerbrick from absorbing the oil and carbon deposits and to greatly facilitate the vaporization of the same.

The water gas carburetor comprises an outer casing 1, asbestos lining 2, a circular composite wall 3, a top 4, bottom 5, grate 6, a blast gas and water gas inlet 7, gas outlet 8, air blast inlets 9, oil inlets 10, oil spray 11, and checker brick 12.

The composite lining of the carburetor is divided into two parts or portions by a course of tile or an equivalent 13, extending outwardly to the shell 1 and inwardly to the brickwork 14 and 15.

The upper portion of this composite wall 3, above tile 13 consists in part of a series of segmental, interlocking, broken jointed, air-cooled high refractory blocks 16, built into said wall 3.

The lower course of these blocks 16 in the composite wall 3, communicates with a manifold 17, supplied with low pressure steam through the inlets 18 and the upper course of said blocks communicates through a multiplicity of passages, flues, or ducts 19 to the interior of the carburetor, said ducts 19 preferably being located between the oil inlets 10. The steam referred to is utilized in a manner well understood in this art to assist in gasifying any free carbon which may be formed.

The lower portion of this composite wall below tile 13, consists in part of a series of segmental, interlocking, broken-jointed, air-cooled high refractory block 16, built into said wall 3.

The upper course of these blocks 16, in the composite wall 3, communicates with a manifold 20, supplied with air, preferably under pressure through the inlets 21.

The air flowing downwardly within and throughout the blocks 16, passes under the grate 6 through a multiplicity of inlets 22 and is utilized to support combustion of the blast gases entering the carburetor during heating of the checkerbrick.

The masonry wall 23, forming part of the composite wall above the tile 13, is supported in part by angles or equivalents 25.

The masonry wall 24, forming part of the composite wall 3, below the tile 13, is integral will the bottom 5.

Each of the segmental unit refractory blocks 16 is provided with horizontal passages, flues or ducts 26, vertical passages, flues or ducts 27 and interlocking tongue and groove portions 28.

Having thus described and illustrated the preferred embodiment of our invention, we do not desire to limit ourselves to the exact construction illustrated, as modifications may be made without departing from the spirit of the invention or scope of the claims.

We claim:—

1. A water gas carburetor, having in combination, a refractory-lined carbureting chamber having passages in said lining, steam admission means to certain of said passages, air admission means to other of said passages, steam and air inlets from their respective passages into the chamber, a water gas inlet in said chamber, and a grate and a checker-work body of refractories, spaced from each other, positioned in the chamber between the steam inlets and the air inlets.

2. A water gas carburetor, having in combination, a refractory-lined carbureting chamber having passages in said lining, steam admission means to certain of said passages, air admission means to other of said passages, steam and air inlets from their respective passages into the chamber, a water gas inlet in said chamber, and a grate and a checker-work body of refractories, spaced from each other, positioned in the chamber between the steam inlets and the air inlets, together with oil admission means adjacent said steam inlets.

3. A water gas carburetor, having in combination, a refractory-lined carbureting chamber having passages in said lining, steam admission means to certain of said passages, air admission means to other of said passages, steam and air inlets from their respective passages into the chamber, and a grate and a checker-work body of refractories, spaced from each other, positioned in the chamber between the steam inlets and the air inlets, together with oil admission means adjacent said steam inlets, a water gas inlet at one end of the chamber, and a carbureted water gas outlet at the other end.

Signed at Long Island City in the county of Queens and State of New York this 27th day of January A. D. 1926.

GEORGE W. DAVEY.
FRANK H. WAITE.